United States Patent [19]

Kakehi et al.

[11] 4,402,527

[45] Sep. 6, 1983

[54] VEHICLE BODY VIBRATION CONTROL APPARATUS

[75] Inventors: Yutaka Kakehi; Kenjirou Kasai; Katsuyuki Terada; Tadashi Beppu, all of Kudamatsu, Japan

[73] Assignee: Hitachi, Ltd., Tokyo, Japan

[21] Appl. No.: 247,534

[22] PCT Filed: Jul. 18, 1980

[86] PCT No.: PCT/JP80/00162
§ 371 Date: Mar. 17, 1981
§ 102(e) Date: Mar. 17, 1981

[87] PCT Pub. No.: WO81/00237
PCT Pub. Date: Feb. 5, 1981

[30] Foreign Application Priority Data

Jul. 20, 1979 [JP] Japan .................. 54-91565

[51] Int. Cl.³ .............. B60G 17/04; B61F 5/22; G05D 19/00; F16F 15/00
[52] U.S. Cl. .................. 280/707
[58] Field of Search ............ 280/701, 707, 6 R, 6 H; 246/167 R; 307/118

[56] References Cited

U.S. PATENT DOCUMENTS

| | | | |
|---|---|---|---|
| 3,124,368 | 3/1964 | Corley et al. | 280/707 |
| 3,873,123 | 3/1975 | Joneleit | 280/707 |
| 3,995,883 | 12/1976 | Glaze | 280/707 |
| 4,164,664 | 8/1979 | Kasiewicz | 280/707 |

*Primary Examiner*—Richard A. Bertsch
*Attorney, Agent, or Firm*—Antonelli, Terry & Wands

[57] ABSTRACT

A vehicle vibration control apparatus in which springs (3A) and (3B) for supporting the vehicle body place in juxtaposition with cylinders (4A) and (4B) for damping the vertical vibrations and a cylinder (4C) for damping the lateral vibrations. The detection signal from the vibration acceleration detectors (5A), (5B) and (5C) are compensated for by compensator circuits (6A), (6B) and (6C), and further amplified by amplifiers (7A), (7B) and (7C) thereby to control the internal pressure of the cylinders (4A), (4B) and (4C) by servo valves (8A), (8B) and (8C). The compensator circuit is comprised in a such manner that the transfer function thereof takes the form of the product of an integration response element, first order lead response elements and first order lag response elements, and therefore the response characteristic of the vehicle body on the vibration acceleration has no peak over a wide range of frequencies.

6 Claims, 10 Drawing Figures

VEHICLE BODY VIBRATION CONTROL APPARATUS

TECHNICAL FIELD

The present invention relates to a vehicle body vibration control apparatus in which springs for supporting the vehicle body are placed in juxtaposition with a fluid operating mechanism which is controlled through a fluid control device from the results detected by a vibration detector, thereby improving the riding quality.

BACKGROUND ART

As a vehicle body vibration control system, a system comprising a spring system provided with a control air spring, for controlling the internal pressure of the control air spring with the vibration acceleration of the vehicle body as a control input, is under development. This system has the advantage that a vehicle supporting spring other than the air spring holds a reference position of a suspension system. In view of the fact that the control input comprises the vibration acceleration of the vehicle body only, however, it is an important problem how to determine a compensator circuit for compensating the vibration acceleration and transferring it to a control device including an amplifier, a servo valve and the like. A compensator circuit presently suggested produces of a first order lead characteristic and a first order lag characteristic given as $$Kb = \frac{K(1 + T_1 S)}{(1 + T_2 S)}$$

or including also a second order lag characteristic, as $$Kb = \frac{K(1 + T_1 S)(1 + T_1{}^1 S)}{(1 + T_2 S)\left(1 + 2\zeta \frac{S}{\omega_n} + \frac{S^2}{\omega_n}\right)}$$

$Kb$: Transfer function of the compensator circuit
$K$: Gain constant
$T_1$: Time constant of the first order lead characteristic
$T_2$: Time constant of the first order lag characteristic
$S$: Laplacian
$\omega_n$: Natural frequency of the second order lag characteristic
$\zeta$: Damping factor ratio of the second order lag characteristic The response acceleration of the vehicle body in the vicinity of the natural frequency which is determined by the vehicle body support spring and the vehicle body mass can be kept at a low level, but the problem point is that the response acceleration of the vehicle body increases somewhat is the in upper and lower frequency ranges other than the frequencies about the natural frequency.

DISCLOSURE OF INVENTION

The present invention is such that the responsiveness of the vehicle body to the vibration acceleration has no peak over a wide range of frequency, or especially in low frequency ranges, thus extremely improving the riding quality.

The present invention is characterized in that, in a vehicle body vibration control system including a vehicle body support spring provided with a fluid operating mechanism for controlling the internal pressure of the fluid operating mechanism through a fluid control device from the results detected by a vibration detector and, the detected vibration acceleration of the vehicle body is compensated by feedback by a compensator circuit utilizing a lead-lag circuit and an integrator, the output of which is used as a control signal for the fluid control device, so that the response of the vehicle body on the vibration acceleration has no peak in low frequency ranges and smoothly decreases with the increase of the frequency. Thus, as compared with the conventional vehicles, the riding quality is extremely improved.

BEST MODE FOR CARRYING OUT THE INVENTION

Figure 1:
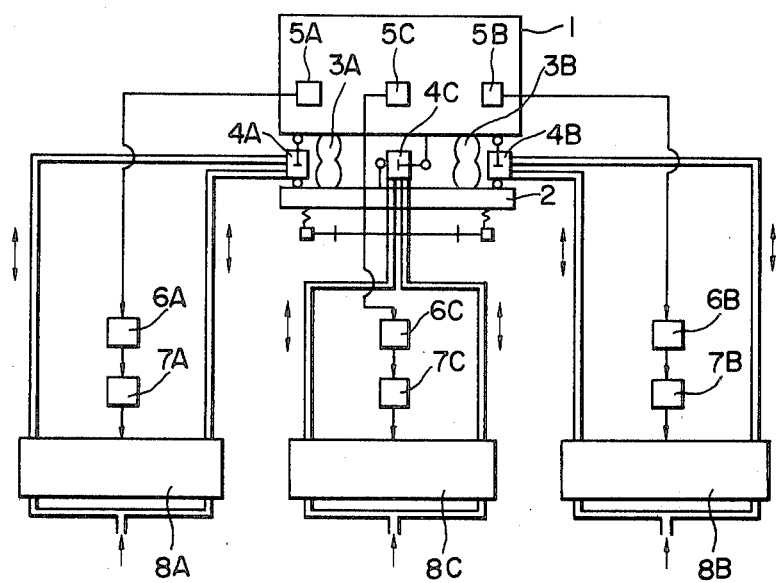
FIG. 1 is a circuit diagram of a vibration control apparatus of a vehicle body showing an embodiment of the present invention.
Figure 2:
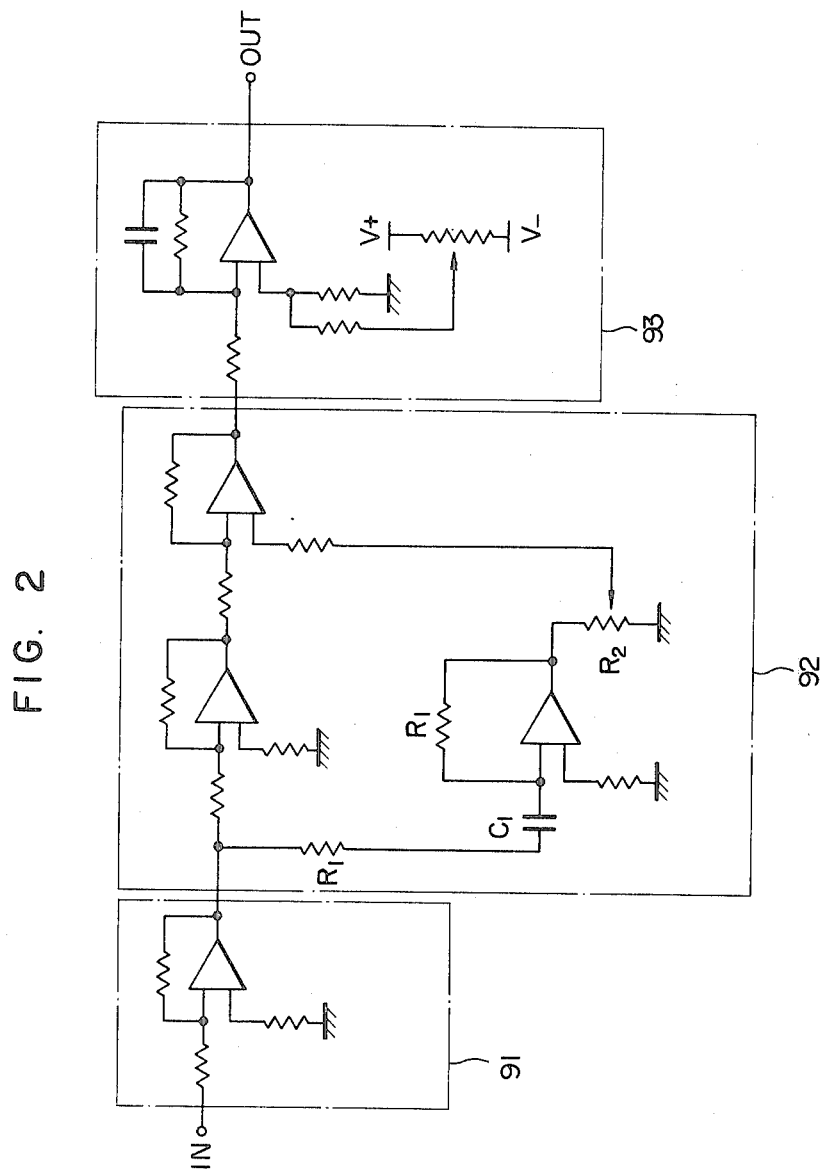
FIG. 2 is a circuit diagram showing an example of the compensator circuit in FIG. 1.

The present invention will be described below in detail with reference to some embodiments. FIG. 1 is a circuit diagram showing an embodiment of a vibration control apparatus of a vehicle body according to the present invention, and FIG. 2 is a circuit diagram showing an embodiment of the compensator circuit. In the drawings, 1 is a vehicle body, 2 is truck, and 3A 3B springs for supporting the vehicle body. 4A, 4B, each is a cylinder which is a fluid operating mechanism for controlling the vibrations of the vehicle body, and 5A, 5B, 5C vibration acceleration detectors. 6A, 6B, 6C are compensator circuits for a detected signal of the respective vibration acceleration detector 5, in which a compensated control signal controls the internal pressure of a respective one of the cylinders 4 through a respective servo valve 8A, 8B, or 8C of a fluid control device for controlling the internal pressure of the cylinder 4 after being amplified by respective one of the amplifiers 7A, 7B, or 7C. Reference characters A and B show control devices for the vertical direction on the right and left sides of the vehicle body and C a control device for the horizontal direction. FIG. 2 shows an example of the compensator circuits 6 in FIG. 1. In this embodiment, it comprises an integrator circuit 93, a lead-lag circuit 92 and a gain circuit 91, and is expressed as $$Kb = \frac{K(1 + T_3S)}{S(1 + T_4S)}$$

K: Gain constant
$T_3$: Time constant of first order lead characteristic
$T_4$: Time constant of first order lag characteristic The time constant $T_3$ of the first order lead characteristic and the time constant $T_4$ of the first order lag characteristic are respectively easily determined by resistors $R_1$, $R_2$, a capacitor $C_1$ and the like.

Figure 3:
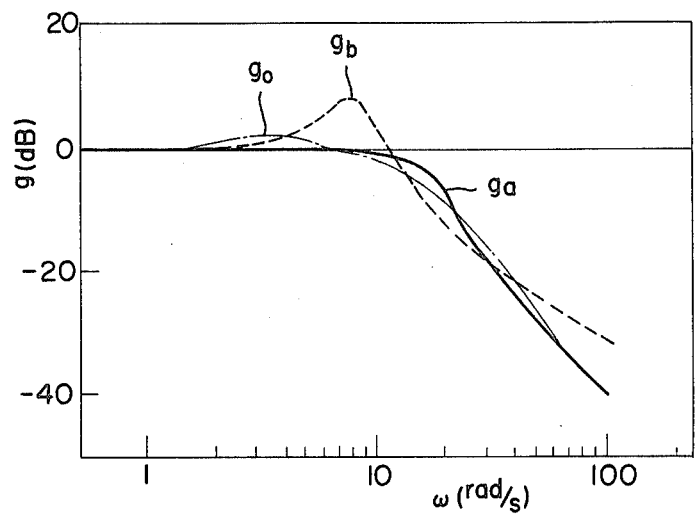
FIG. 3 is a gain diagram showing a response magnification of the system.
Figure 4:
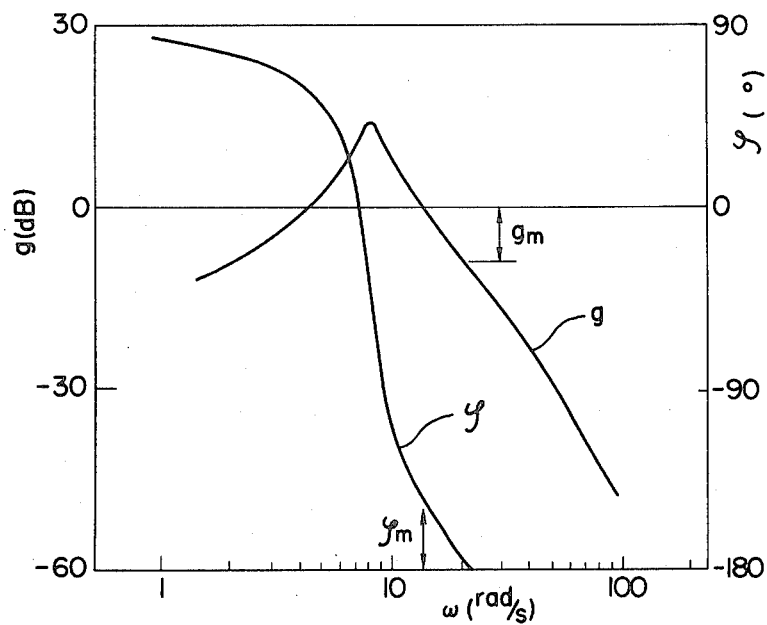
FIG. 4 is a Bode diagram of a loop transfer function of the system for showing the stability.

FIGS. 3 and 4 show frequency characteristics of the vibration control apparatus configured as shown above in which the axle spring is ignored in all directions. FIG. 3 shows a gain characteristic of the system in which the response magnification of the vehicle body vibration is plotted in decibel value with respect to the input track irregularities. FIG. 4 shows a Bode diagram of a loop transfer function of the control system whereby it is possible to explain the stability and the control performance of the system by the gain margin $g_m$ and the phase margin $\phi_m$ determined from the characteristic of the gain g and the phase $\phi$. In this embodiment, $\phi_m = 33°$ and $g_m = 9$ dB, so that a stable solution is obtained. Further, as shown in the characteristics curve of the gain $g_a$ of the system shown in FIG. 3, the response value is reduced with the increase in the angular frequency $\omega$, and also in comparison with the gain characteristic $g_b$ of the spring-damper system of a conventional vehicle not actively controlled, the response reduction of about 8 dB at the natural frequency $\omega = 8$ rad/S determined by the spring 3 and the vehicle body weight is obtained. Also, in comparison with the gain characteristic $g_o$ of the system in an active control system not utilizing an integration response characteristic such as $$Kb = K\frac{(1 + T_1S)}{(1 + T_2S)}$$

as in the conventional apparatus, the excessive lead of phase or excessive amplification at low frequencies is prevented by the integrator, thus providing characteristics which are superior due to their being free of a peak (2 dB) at low frequencies.

In this embodiment, $T_3 = 0.083$ (S) and $T_4 = 0.016$ (S) and the time constant of the first order lead response component is larger than the time constant of the first order lag response component, resulting in superior characteristics. It is effective to use the time constant of the first order lead response component as a value near the reciprocal of the natural frequency determined by the weight of the vehicle body and the spring constant, and to use a value of the time constant of the first order lag response component smaller than the value of the time constant of the first order lead response component.

Figure 5:
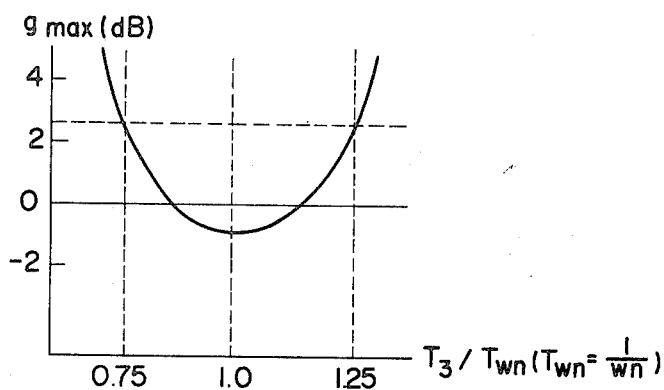
FIG. 5 is a diagram showing the relation between the time constant of a phase lead element and the control characteristics.

FIG. 5 shows an effect that the time constant $T_3$ of the phase lead has on the control characteristics, in which the abscissa represents the ratio between the time constant $T_3$ of the phase lead response component and the reciprocal $T\omega_n$ of the natural angular frequency $\omega_n$ determined by the mass of the vehicle body 1 and the spring constant of the spring 3, and the ordinate represents the response value $g_{max}$ of the system at the vibration frequency $\omega = \omega_n$. As seen from this diagram, it is recommended that the time constant $T_3$ of the phase lead response component be in the vicinity of $T\omega_n$ ($T_3/T\omega_n \approx 1$) and that the phase lead and the amplification start frequency conform to the natural angular frequency $\omega_n$. In particular, in order to render the response value lower than the peak value of the gain characteristic $g_o$, it is effective to produce the apparatus with $T_3/T\omega_n$ in the range from 0.75 to 1.25.

From the gain characteristics of the system shown in FIG. 3, it is noted that in the vicinity of $\omega = 15$ rad/S, the response of the embodiment under consideration is slightly higher than the response of the spring and damper system of the conventional vehicle body not actively controlled. In order to further improve this situation, it is effective to compound the first order lag and the first order lead response components and use $$Kb = \frac{K(1 + T_3S)(1 + T_5S)}{S(1 + T_4S)(1 + T_6S)}$$

Figure 6:
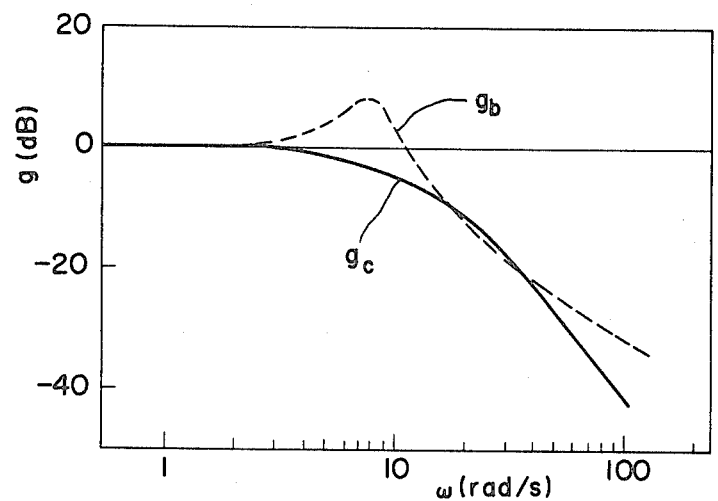
FIG. 6 is a diagram showing the gain characteristics of the system in another compensator circuit.

$T_5$: Time constant of first order lead response components
$T_6$: Time constant of first order lag response components as a compensator circuit response. Such a compensator circuit response is easily obtained by successively using two lead-lag circuits 92 of the compensator circuit shown in FIG. 2. The gain characteristic $g_c$ of the system with the compensator produced in this way is shown, together with the gain characteristic $g_b$ of a conventional vehicle, in FIG. 6. As noted, the gain characteristic $g_c$ is almost the same as that of the conventional vehicle even in the vicinity of $\omega = 15$ rad/S, and the reduction of about 10 dB is possible at $\omega = 8$ rad/S. In this embodiment, the time constants of the first order lead response element are $T_3 = 0.1$ (S) and $T_5 = 0.13$ (S), and the time constants of the first order lag response element are $T_4 = 0.008$ (S) and $T_6 = 0.004$ (S). The two time constants of the first order lead response element are respectively smaller and larger than the reciprocal of the natural angular frequency determined by the vehicle body mass and the spring 3, while the two time constants of the first order lag response element are respectively smaller than the smaller one of the two time constants of the first order lead response element to provide an effective result. Also, an air servo valve 8 is used for controlling the cylinder 4, and in the case where the time constant of the first order lag response element of the air servo valve 8 is large, the two time constants of the phase lead response element are rendered respectively a value of the reciprocal of the natural frequency due to the spring 3 and the vehicle body mass and a value of the time constant of the first order lag response element of the air servo valve 8, and in addition the two time constants of the first order lag response element are rendered smaller than the smaller one of the two time constants of the first order lead response element to attain an effective result.

Figure 7:
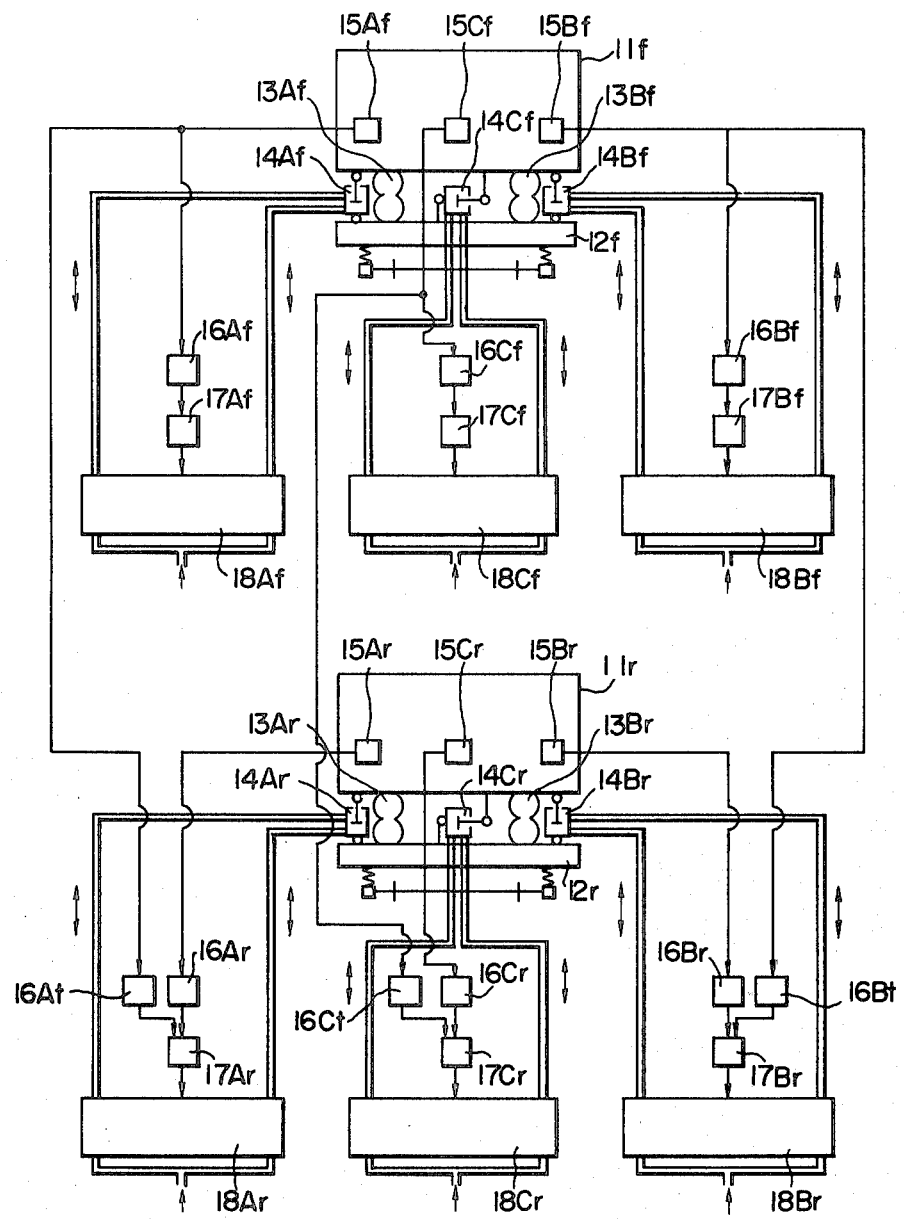
FIG. 7 is a circuit diagram showing an example in which the present invention is applied to a vibration control apparatus of a vehicle body including a preview control compensation.
Figure 8:
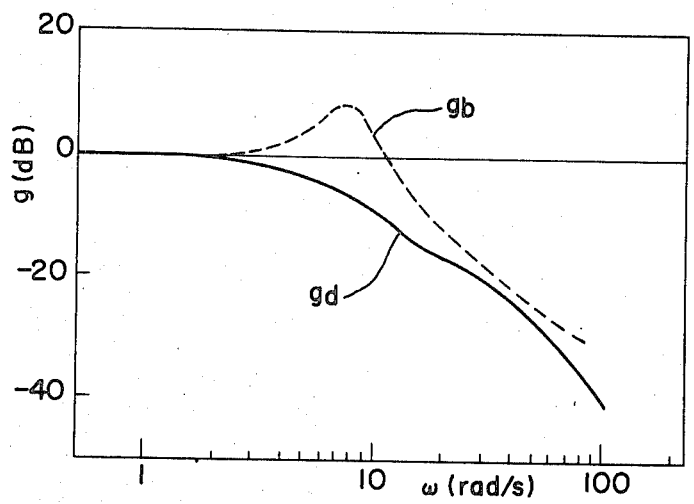
FIG. 8 is a gain diagram of the system of FIG. 7, and FIGS. 9 and 10 are circuit diagrams showing a method of setting a time lag $\tau$ against speed with respect to the preview control compensation.

FIG. 7 shows an example of application of the present invention, illustrating a vehicle body vibration control apparatus in which the vibration acceleration of the front part of the vehicle body is detected, and taking into consideration the speed of the vehicle body and the distance between front and rear trucks, is subjected to preview compensation to effect compensation for a predetermined length of time and transfer in combination with the feedback compensation of the vibration acceleration of the rear part of the vehicle body. In the diagram, 11f shows the front part of the vehicle body, 11r the rear part of the vehicle body, 12f the front truck, and 12r the rear truck. 13 shows a spring for supporting said front and rear parts of the vehicle body 11f and 11r, 14 a control cylinder, 15 a vibration acceleration detector, 16 a compensator circuit, 17 an amplifier, and 18 a servo valve. Symbols A and B show control devices for vertical direction of the right and left sides of the vehicle body and symbol C a control device for horizontal direction thereof in a manner similar to FIG. 1. The suffix f indicates the front part of the vehicle body and the suffix r is associated with the rear part of the vehicle body. 16At to 16Ct show preview compensator circuits for respective directions, and 16Ar to 16Cr show feedback compensator circuits. Also, FIG. 8 shows the gain characteristic $g_d$ of the rear part of the vehicle body 11r with a preview compensator circuit using $$Kf = \frac{K(1 + T_3S)(1 + T_5S)}{S(1 + T_4S)(1 + T_6S)} e^{-\tau S}$$

where $\tau$ is a delay time of the same track irregularity input to the rear truck 12r relative to the front truck 12f, and is a function determined by $\tau = 1/V$ from the distance 1 between the front truck 12f and the rear truck 12r and the running speed V. In this way, the control performance is capable of being further improved by adding preview compensation.

In this embodiment, a preview compensation signal is used delaying the vibration acceleration of the front part of the vehicle body 11f. As an alternative, track irregularity data measured and stored in advance may be used. In the case of a preview compensation where the vibration acceleration of the front part of the vehicle body 11f is delayed, the compensator circuit response is effectively comprised of the product of an integrator response element, a first order lead response element and a first order lag response element, and if this compensator circuit is made identical to the feedback compensator circuit, the unit cost is reduced thereby to attain an effective control characteristic.

Figure 9:
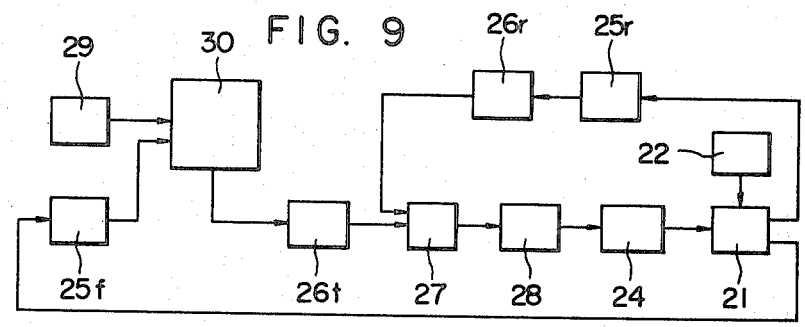
Figure 10:
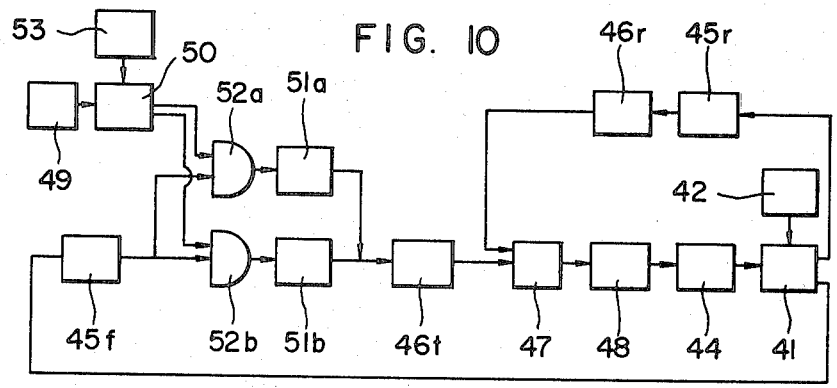

FIGS. 9 and 10 show circuit diagrams showing a vibration control apparatus including a delay circuit for setting a delay time in accordance with the change in the running speed. The embodiment of FIG. 9 features that the delay time is set by such a device as a computer thereby to compensate for the control signal. From the output of the running speed detector 29 which is successively supplied, a delay time is calculated, and the output of the vibration acceleration detector 25f for the front part of the vehicle body 21 is delayed in accordance with the running speed of the computer 30. After the output signal of the computer 30 is compensated for by the preview compensator circuit 26t, the output of the vibration acceleration detector 25r for the rear part of the vehicle body 21 is compensated for by the feedback compensator circuit 25r. These signals are combined at the amplifier 27, and the servo valve 28 is actuated to control the internal pressure of the cylinder 24, so that the vibration acceleration of the rear part of the vehicle body due to the vibrating force 22 derived from the track irregularity is controlled. Thus, an accurate preview control is possible. The embodiment of FIG. 10 is for determining the delay time in accordance with the speed range set in advance and for setting a delay time in accordance with the running speed by use of a delay element, and is easily comprised of a reference speed range setter 53, a comparator 50, AND gates 52a, 52b, delay elements 51a and 51b and the like. In this diagram, 49 shows a running speed detector, 45f and 45r show vibration acceleration detectors for the front part and rear part of the vehicle body respectively, 46t shows a preview compensator circuit, and 46r shows a feedback compensator circuit. The amplifier 47, the servo valve 48, the cylinder 44, the vehicle body 41 and the vibrating force 42 are the same as those shown in FIG. 4. As compared with the embodiment shown in FIG. 9, the embodiment under consideration is rather inferior in control characteristics but low in cost as it is capable of being configured of simple circuits.

In the foregoing description, the control devices including the air servo valve and the air cylinder use air, which may be replaced by oil as an operating fluid or by a solenoid valve or an air spring.

As explained above, according to the present invention, the response of the vehicle body on the vibration acceleration has no peak and is smoothly reduced with the increase of frequency over a wide range of frequencies, especially in low frequency ranges. Therefore, the riding quality can be remarkably improved over conventional vehicles.

We claim:

1. A vehicle body vibration control apparatus comprising: springs for supporting the vehicle body, a fluid operating mechanism disposed in parallel with said springs for damping the vibration of said vehicle body, a vibration detector provided on the vehicle body for detecting the acceleration thereof, a compensator circuit for compensating for the results detected by said vibration detector, and a fluid control device for applying fluid of a required amount to said fluid operating mechanism in response to the compensated results detected by said vibration detector, wherein said compensator circuit includes an integrator for producing an integration response component, and a lead-lag circuit for producing a response having components corresponding to a summation of a proportional element and a differential element.

2. A vehicle body vibration control apparatus according to claim 1, characterized in that a time constant of a first order lead response characteristic produced by said compensator circuit is larger than a time constant of a first order lag response characteristic produced thereby.

3. A vehicle body vibration control apparatus according to claim 2, characterized in that the time constant of said first order lead response characteristic is a value 0.75 to 1.25 times the reciprocal of the natural frequency determined by the vehicle body supporting spring and the mass of the vehicle body.

4. A vehicle body vibration control apparatus according to claim 1, characterized in that said compensator circuit is constructed to produce two first order lead response components and two first order lag response components, respectively.

5. A vehicle vibration control apparatus according to claim 4, characterized in that the time constants of the first order lead response components are respectively smaller and larger than the reciprocal of the natural frequency determined by the vehicle body supporting spring and the mass of the vehicle body, and the time constants of the first order lag response components are respectively smaller than the smaller one of the two time constants of said first order lead response component.

6. A vehicle body vibration control apparatus according to claim 4, characterized in that said fluid operating mechanism is an air operating mechanism, the fluid control device is an air servo valve, the time constants of the first order lead response component are respectively a value equal to the reciprocal of the natural frequency determined by the vehicle body supporting spring and the vehicle body mass and a value of the time constant of the first order lag response component of the air servo valve, and the time constants of the first order lag response component are respectively smaller than the smaller one of the two first order lead response components.

* * * * *